(12) United States Patent
Kodama et al.

(10) Patent No.: US 12,345,159 B2
(45) Date of Patent: Jul. 1, 2025

(54) MEASUREMENT SYSTEM AND MEASUREMENT METHOD

(71) Applicant: Komatsu Ltd., Tokyo (JP)

(72) Inventors: Yuichi Kodama, Tokyo (JP); Shinichi Terada, Tokyo (JP); Eiichi Morioka, Tokyo (JP); Takashi Nagayoshi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 17/638,997

(22) PCT Filed: Aug. 26, 2020

(86) PCT No.: PCT/JP2020/032127
§ 371 (c)(1),
(2) Date: Feb. 28, 2022

(87) PCT Pub. No.: WO2021/044914
PCT Pub. Date: Mar. 11, 2021

(65) Prior Publication Data
US 2022/0341322 A1  Oct. 27, 2022

(30) Foreign Application Priority Data
Sep. 5, 2019 (JP) ................. 2019-161959

(51) Int. Cl.
*E21C 41/22* (2006.01)
*E21C 39/00* (2006.01)
*G01N 23/223* (2006.01)

(52) U.S. Cl.
CPC ............. *E21C 41/22* (2013.01); *E21C 39/00* (2013.01); *G01N 23/223* (2013.01); *G01N 2223/0745* (2013.01)

(58) Field of Classification Search
CPC ....... E21C 41/22; E21C 39/00; G01N 23/223; G01N 2223/0745
See application file for complete search history.

(56) References Cited

U.S. PATENT DOCUMENTS 4,079,997 A * 3/1978 Bienko .................. E21C 35/08
299/1.2
4,952,000 A * 8/1990 Lipinski ................. E21C 35/24
702/6

(Continued)

FOREIGN PATENT DOCUMENTS

CN   102 140 930 A    8/2011
JP   2000-204872 A    7/2000

(Continued)

OTHER PUBLICATIONS

Supplementary European Search Report dated Jun. 21, 2023 issued in the corresponding EP patent application No. 20861307.5.

(Continued)

*Primary Examiner* — Janine M Kreck
(74) *Attorney, Agent, or Firm* — Troutman Pepper Locke LLP

(57) ABSTRACT

A measurement system 50 measures a grade of an excavated material generated from an underground tunnel including a plurality of mining points. The underground tunnel is constructed based on a mining plan of a mine planned based on primary grade data and primary position data corresponding to the primary grade data measured in a preliminary geological survey. The measurement system includes a measuring unit (grade measuring unit) 61 that measures the grade of the excavated material generated from the underground tunnel, a secondary grade data acquisition unit (grade data acquisition unit) 72 that acquires secondary grade data indicating the grade of the excavated material from the measuring unit 61, and a secondary position data acquisition (Continued)

unit (position data acquisition unit) 73 that acquires secondary position data corresponding to the secondary grade data.

7 Claims, 9 Drawing Sheets

(56) References Cited

U.S. PATENT DOCUMENTS

| | | | |
|---|---|---|---|
| 5,967,616 A | * | 10/1999 | Offutt .................... E21C 35/20 |
| | | | 299/30 |
| 2003/0052529 A1 | | 3/2003 | Hakkinen |
| 2004/0262980 A1 | | 12/2004 | Watson |
| 2005/0023881 A1 | | 2/2005 | Frederick et al. |
| 2009/0240481 A1 | | 9/2009 | Durrant-Whyte et al. |
| 2009/0256412 A1 | | 10/2009 | Nieto et al. |
| 2013/0169961 A1 | | 7/2013 | Kraft |
| 2015/0268168 A1 | | 9/2015 | Thornton et al. |

FOREIGN PATENT DOCUMENTS

| | | |
|---|---|---|
| JP | 2002-013381 A | 1/2002 |
| JP | 2003-527514 A | 9/2003 |
| JP | 2008-115554 A | 5/2008 |
| JP | 2018-109642 A | 7/2018 |
| WO | 2009/109006 A1 | 9/2009 |
| WO | 2011/120086 A1 | 10/2011 |
| WO | 2015/151734 A1 | 10/2015 |

OTHER PUBLICATIONS

Angel Prior et al., "Real-Time Mining," Real Time Mining under Horizon 2020 Grant Agreement 641989, Mar. 24, 2019, pp. 1-26. (cited in the Jun. 21, 2023 Search Report issued for EP20861307.5).

* cited by examiner

MEASUREMENT SYSTEM AND MEASUREMENT METHOD

FIELD

The present invention relates to a measurement system and a measurement method.

BACKGROUND

As a mining method for mining ore from a mine, a surface mining method for mining the ore from a ground surface and an underground mining method for mining the ore from underground are known. In the surface mining method, there is known a technique for performing mining work after creating distribution map data of ore at a time of drilling for blasting (see, for example, Patent Literature 1). In the surface mining method, a technique for evaluating an ore grade by scanning a bench is known (see, for example, Patent Literature 2). A technique for evaluating the ore grade using laser induced breakdown spectroscopy at the time of mining and the like is known (see, for example, Patent Literature 3).

CITATION LIST

Patent Literature

Patent Literature 1: JP 2000-204872 A
Patent Literature 2: WO 2009/109006 A
Patent Literature 3: WO 2011/120086 A

SUMMARY

Technical Problem

Mining ore from a mine takes a great deal of time and money. In order to improve productivity, it is necessary to accurately grasp an ore grade. Therefore, it is desired to improve the measurement accuracy of the ore grade and increase opportunities of measuring the ore grade. Techniques described in the above-mentioned Patent Literatures 1 to 3 are mainly techniques that are assumed to be applied to mining using the surface mining method.

An object of the present invention is to measure the ore grade in the underground mining method.

Solution to Problem

According to an aspect of the present invention, a measurement system that measures a grade of an excavated material generated from an underground tunnel including a plurality of mining points, the underground tunnel being excavated based on a mining plan of a mine planned based on primary grade data indicating an ore grade measured in a preliminary geological survey and primary position data corresponding to the primary grade data, the measurement system comprises: a grade measuring unit that measures the grade of the excavated material generated from the underground tunnel; a grade data acquisition unit that acquires secondary grade data indicating the grade of the excavated material from the grade measuring unit; and a position data acquisition unit that acquires secondary position data corresponding to the secondary grade data.

According to an aspect of the present invention, a measurement method of measuring a grade of an excavated material generated from an underground tunnel including a plurality of mining points, the underground tunnel excavated based on a mining plan of a mine planned based on primary grade data indicating an ore grade measured by a preliminary geological survey and the primary grade data, the measurement method comprises: acquiring secondary grade data indicating the grade of the excavated material from a grade measuring unit that measures the grade of the excavated material generated from the underground tunnel; and acquiring secondary position data corresponding to the secondary grade data.

Advantageous Effects of Invention

According to the present invention, an ore grade can be measured in the underground mining method.

DESCRIPTION OF EMBODIMENTS

Hereinafter, an embodiment of the present invention will be described with reference to the accompanying drawings. However, the present invention is not limited thereto. Components in the embodiment described below can be appropriately combined. In addition, some components may not be used. In the embodiment, an ore grade is measured with high accuracy in an underground mining method, which is one of the mining methods for mining ore from a mine.

[Overview of Mine Development]

A life cycle of a mine is wide-ranging, starting with search and exploration of ore vein (ore body), development of a mine, production of ore, and then mine closure, restoration, and utilization of mined land. For example, exploration alone takes about 10 to 20 years. Mine development requires a great deal of time and cost.

As a mining method for mining ore from a mine, there is an underground mining method in which a tunnel (underground tunnel) R is dug underground to mine an underground vein. The underground mining method includes, for example, a block caving method, a room-and-pillar method, and a sublevel stopping method. In this embodiment, the block caving method will be described. However, the present invention is not limited thereto.

In the underground mining method, for example, shaft, declined or inclined shaft, ramp, adit, and drift are used for an access from the ground to the underground. For example, to access to an underground ore vein, horizontal tunnel (header) and inclined and declined shafts are used.

Figure 1:
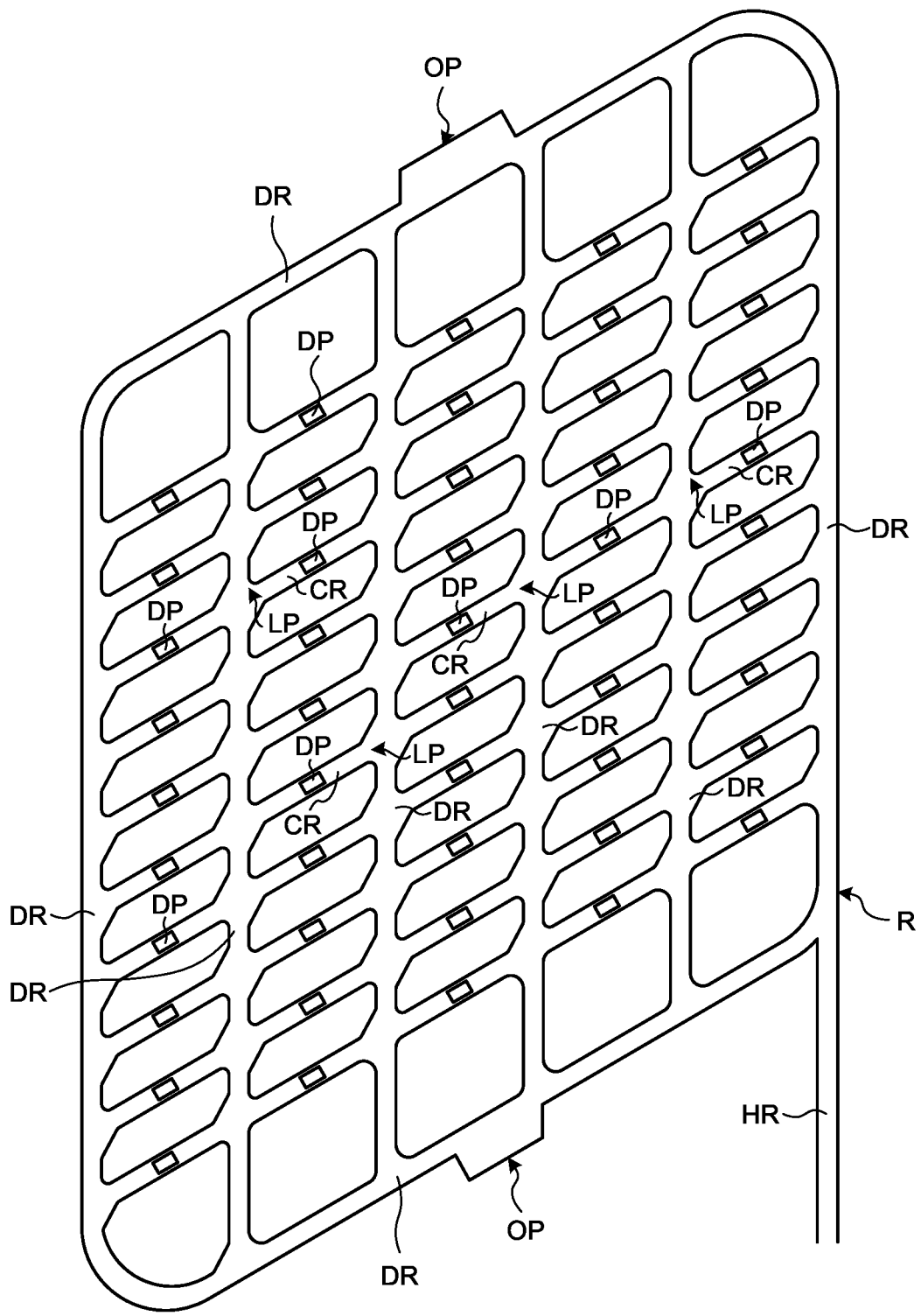
FIG. 1 is a schematic diagram illustrating an example of an inside of a mine in a block caving method.

FIG. 1 is a schematic diagram illustrating an example of an inside of the mine in the block caving method. A tunnel R in the mine illustrated in FIG. 1 includes a horizontal tunnel HR (header) for an access to the underground vein. A plan view of the tunnel R in the mine as illustrated in FIG. 1 is called a footprint. The footprint is created based on a mining plan of the mine. FIG. 1 illustrates the footprint having a substantially parallel quadrilateral outer rim. However, it is obvious that the shape of the footprint is not limited thereto. The mining plan of the mine is created based on primary grade map data including data of a scale, shape and primary grade of the ore acquired by a preliminary geological survey, such as a boring survey, at the time of search and exploration of the vein. The mining plan of the mine includes a footprint shape, a mining method, a mining schedule, equipment used for mining, and the like. The primary grade map data indicates a distribution of ore grades in the mine.

In the block caving method, an ore extraction section (mining point) DP and the tunnel R for transporting the extracted ore are provided at a bottom of the vein. Then, an upper part of the extraction section DP is undercut and blasted (in other words, upper rock is blasted by blasting from the tunnel provided on the footprint) to make the ore collapse under its own weight and extract the ore from the extraction section DP. When the ore is extracted from a lower part of the vein, the collapse propagates to the upper part, so that the ore in the vein can be efficiently extracted (see FIG. 3).

The tunnel R illustrated in FIG. 1 includes a first tunnel DR in which a transport machine travels and a second tunnel CR in which a loading machine is arranged for loading work passing through the extraction section DP. The extraction section DP is provided in the second tunnel CR. When it is not necessary to distinguish between the first tunnel DR and the second tunnel CR, it will be described as the tunnel R. A loading position LP where the loading machine performs the loading work with respect to the transport machine is provided in or near the second tunnel CR. In addition, a soil discharge position OP is provided in the mine to discharge the ore transported by the transport machine. Instead of using the transport machine, the loading machine loaded with the ore may be used to directly transport the ore to the soil discharge position OP.

FIG. 1 illustrates the tunnel R at the mining level. At the mining level, the loading machine drops the ore into a vertical hole connecting the mining level and a transport level at the soil discharge position OP. At the transport level (not illustrated), the transport machine transports the ore dropped from the mining level. In this embodiment, the mining level and the transport level are different. However, the mining level and the transport level may be the same level.

[Tunnel Excavator]

Figure 2:
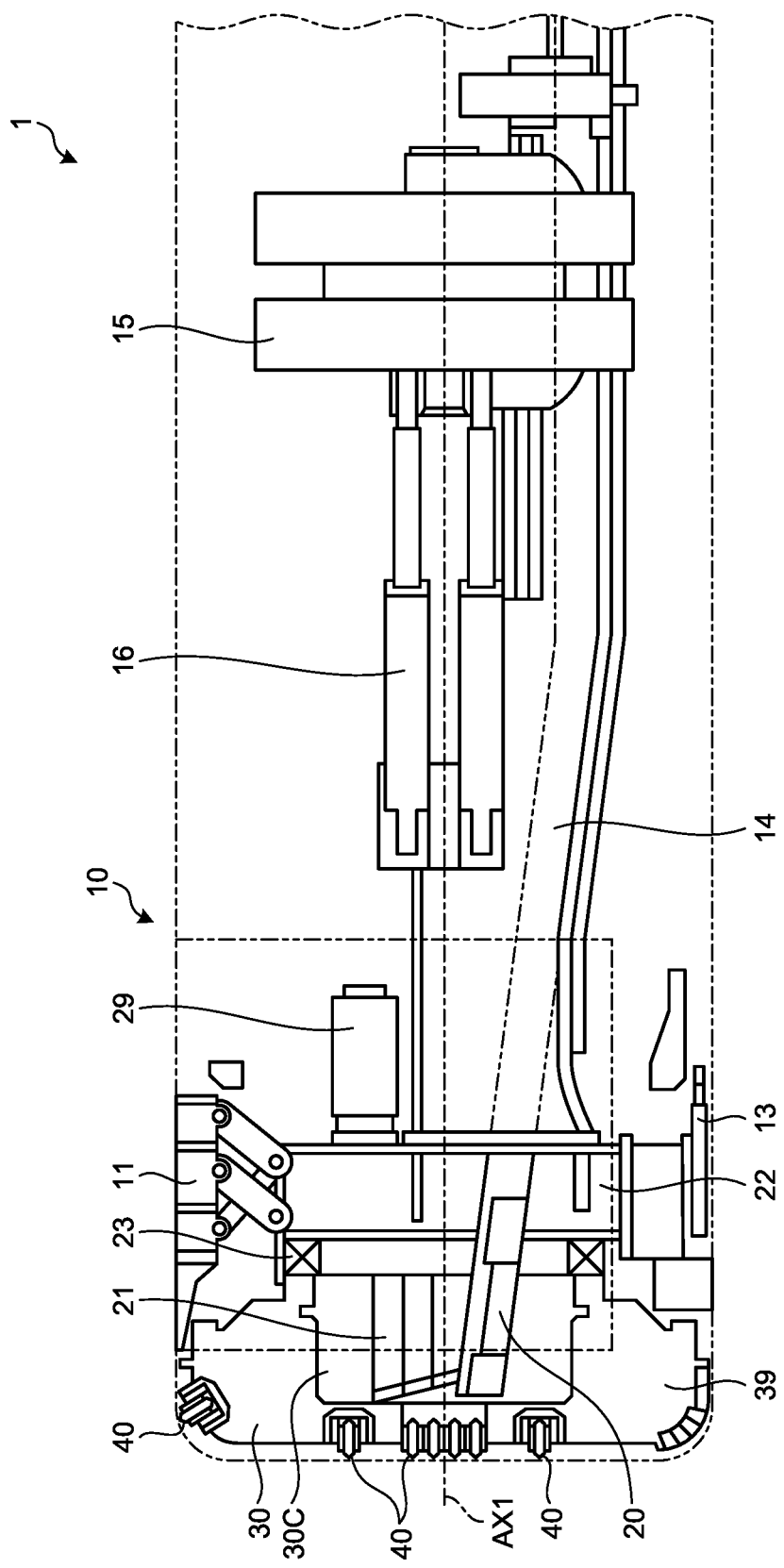
FIG. 2 is a side view illustrating a configuration of a tunnel excavator.

FIG. 2 is a side view illustrating a configuration of a tunnel excavator 1. When the tunnel R is constructed, the tunnel excavator 1 excavates a bedrock based on the footprint to construct the tunnel R. The tunnel excavator 1 includes a main body 10 and a cutter head 30 installed on the front side of the main body 10 for excavating the bedrock. The cutter head 30 has a dome shape, and a cutter chamber 30C, which is a space for taking in excavation muck generated by excavation, is formed inside the cutter head 30.

The main body 10 has a main beam 14 extending in a front-back direction and a cutter head support 22 provided on a front end of the main beam 14. The cutter head 30 is rotatably coupled to the cutter head support 22 via a bearing 23. The cutter head support 22 of the main body 10 is provided with a roof support 11 on its upper part, a side support (not illustrated) on its side, and a vertical support 13 on its lower part. The roof support 11, a side support 12, and the vertical support 13 are installed in a cylindrical shape so that their outer circumference follows an excavation cross-sectional shape.

A gripper 15 that is pressed against a mine wall of the tunnel R and a thrust jack 16 that can be expanded and contracted along the main beam 14 are installed inside the main body 10. In an axial direction, a front end of the thrust jack 16 is attached to the front side of the main beam 14 and a rear end of the thrust jack 16 is attached to the gripper 15. The thrust jack 16 is installed in an expandable manner in the front-back direction. The tunnel excavator 1 generates a propulsive force by expanding and contracting the thrust jack 16. The tunnel excavator 1 obtains a propulsion reaction force by pressing the gripper 15 against the tunnel wall of the tunnel R.

A belt conveyor 20 extending in the front-back direction, a hopper chute 21 installed on an upper part of the front side of the belt conveyor 20, and the cutter head support 22 installed on a front end of the main beam 14, and a drive motor 29 are provided inside the main body 10. The belt conveyor 20 transports the excavation muck generated by excavation toward the back side. The belt conveyor 20 is installed inside the main beam 14 formed in a tubular shape, and its tip side penetrates the cutter head support 22 and extends into the cutter chamber 30C. The hopper chute 21 opens in the cutter chamber 30C and guides the excavation muck scooped up by a bucket 39 of the cutter head 30 to the belt conveyor 20. The cutter head support 22 rotatably supports the cutter head 30 about its rotation shaft AX1. The drive motor 29 for rotating the cutter head 30 is installed in the cutter head support 22. The drive motor 29 is a hydraulic motor or an electric motor.

The drive motor 29 is installed in the cutter head support 22 to which the cutter head 30 is connected via the bearing 23. The cutter head 30 is rotated about the rotation shaft AX1 by the drive motor 29. A diameter of the cutter head 30 is about several meters. The cutter head 30 moves in the front-back direction with respect to the gripper 15 as the thrust jack 16 expands and contracts. A plurality of disc cutters 40 are mounted on the cutter head 30. The cutter head 30 is installed at the front of the main body 10. The plurality of disc cutters 40 are installed on the cutter head 30.

The tunnel excavator 1 is controlled by a controller (not illustrated). The controller operates the tunnel excavator 1 based on, for example, operation information input via an operation panel (not illustrated) or operation information input via an excavation management system (not illustrated).

[Excavation Method by Tunnel Excavator]

An excavation method by the tunnel excavator 1 configured in this way will be described. In the tunnel excavator 1, the cutter head 30 is rotated with respect to the main body 10 by the drive motor 29. To crush the bedrock, the disc cutter 40 attached to the cutter head 30 rotates while being pressed against an excavating surface of the tunnel R. The bucket 39 scoops the excavation muck (excavated material) generated during the excavation of the bedrock into the main body 10, and a belt conveyor 17 transports the excavation muck to the back side.

[Measurement System]

Figure 3:
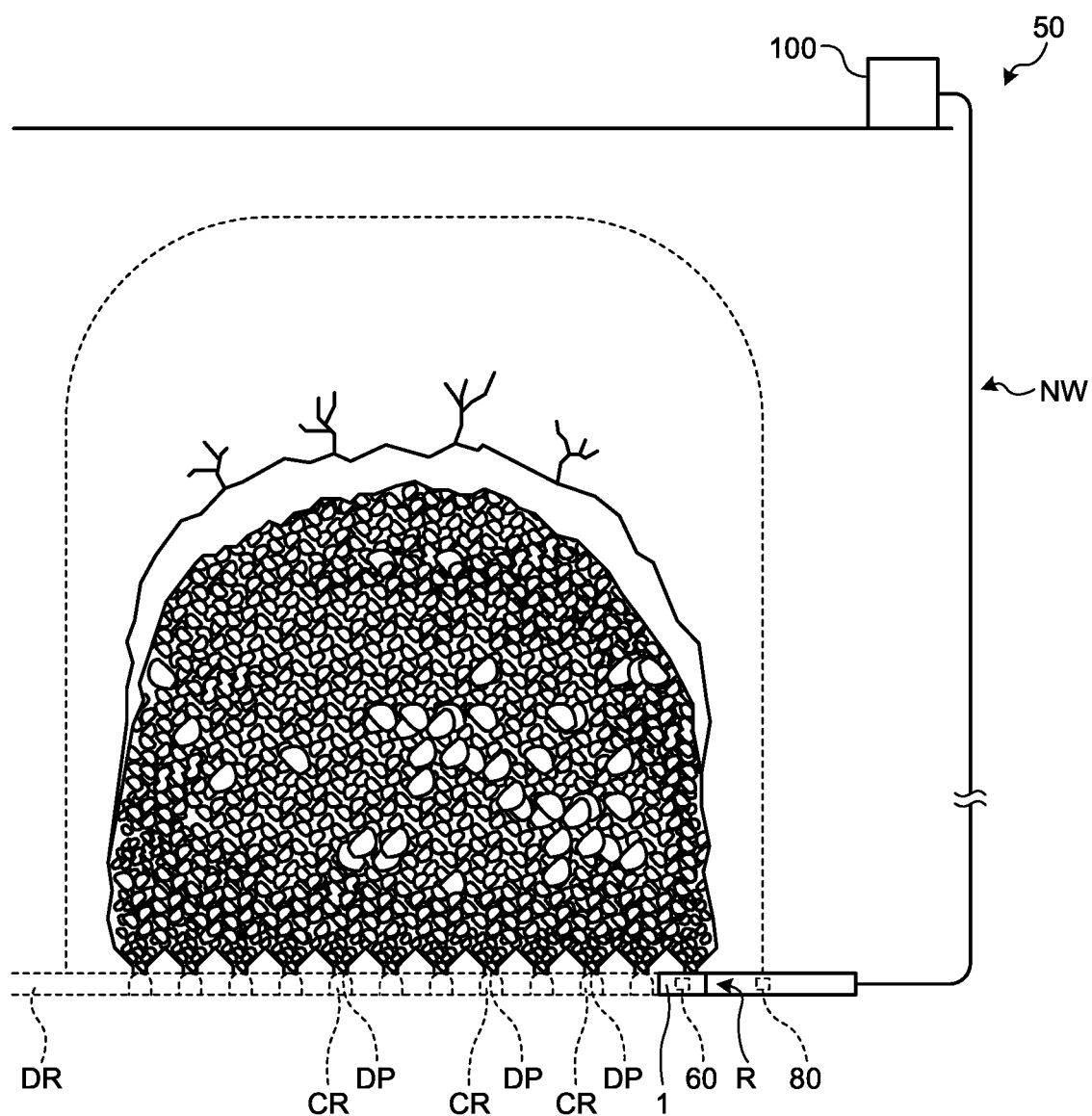
FIG. 3 is a schematic diagram illustrating an outline of a measurement system according to the present embodiment.

FIG. 3 is a schematic diagram illustrating an outline of a measurement system 50 according to the present embodiment. The measurement system 50 measures a grade of excavation muck that is excavated materials (excavated materials generated during the construction of the tunnel R in a development stage of the mine and excavated materials generated during mining in the tunnel R in an ore production stage) generated from the tunnel R including the extraction section DP that are a plurality of mining points in the tunnel R according to a mining plan of the mine planned based on a primary grade map data indicating an ore grade distribution generated from a primary grade data indicating the ore grade measured by a preliminary geological survey including a boring survey performed at the time of search and exploration and primary position data corresponding to the primary grade data. The measurement system 50 measures secondary grade data indicating the ore grade along the tunnel R when the tunnel R is constructed by the tunnel excavator 1. The measurement system 50 generates secondary grade map data (grade map data) indicating an ore grade distribution along the tunnel R from the secondary grade data. By measuring the secondary grade data along the entire tunnel R, the secondary grade data map for the footprint illustrated in FIG. 1 can be obtained. The measurement system 50 includes a grade measuring device 60 installed in the tunnel excavator 1, a positioning device 80 installed in the vicinity of the grade measuring device 60, and a management device 100 installed in a management facility above the ground and the like. The management facility does not necessarily have to be above the ground, and may be under the ground. The grade measuring device 60 and the positioning device 80 are connected so as to be able to transmit and receive data via a communication network NW. The grade measuring device 60 and the management device 100 are connected so as to be able to transmit and receive data via the communication network NW. The communication network NW is a wireless communication, such as Wi-Fi, or a wired communication.

In FIG. 3, in order to facilitate understanding of the characteristics of the block caving method, a state where the ore is extracted from the extraction section DP and a collapse is propagated to the upper part (i.e., production stage) and a state of construction of the tunnel R (i.e., mine development stage) are illustrated together. In reality, however, the ore is extracted (production) after the tunnel R is constructed (development).

[Grade Measuring Device]

Figure 4:
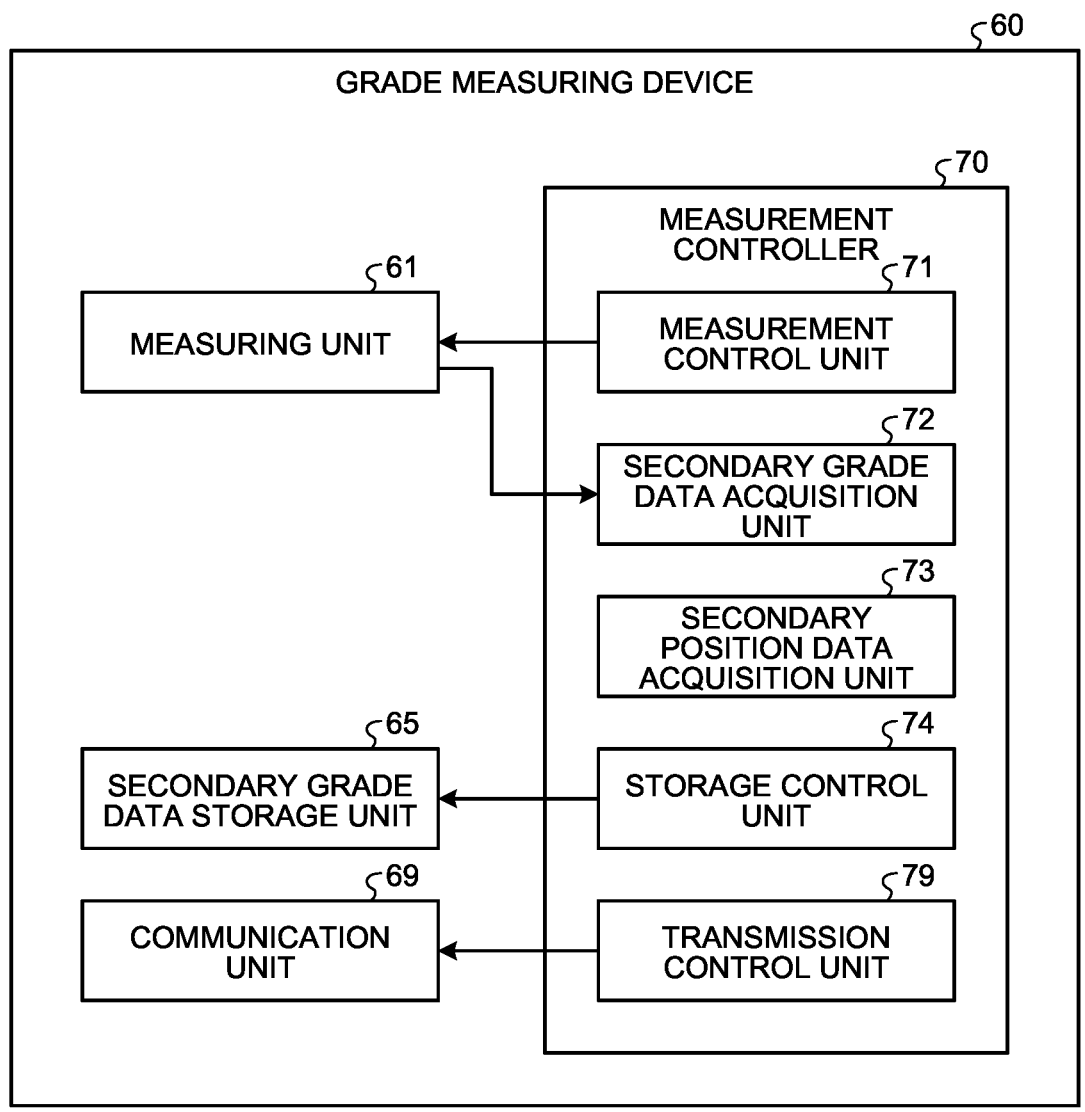
FIG. 4 is a block diagram illustrating a grade measuring device.

FIG. 4 is a block diagram illustrating the grade measuring device 60. The grade measuring device 60 measures the secondary grade data indicating the ore grade along the tunnel R when the tunnel R is constructed by the tunnel excavator 1. The grade measuring device 60 measures the secondary grade data while the measurement system 50 is activated. More specifically, the grade measuring device 60 measures the grade of excavation muck generated by excavation when the tunnel R is constructed by the tunnel excavator 1. The grade of excavation muck is the ore grade along the tunnel R. The secondary grade data indicates the grade of excavation muck generated by excavation during the construction of the tunnel R. The secondary grade data includes, for example, data on elemental composition and element content of the excavation muck. The grade measuring device 60 is installed inside the main body 10 of the tunnel excavator 1. The grade measuring device 60 includes a measuring unit (grade measuring unit) 61, a secondary grade data storage unit (grade storage unit) 65, a communication unit 69, and a measurement controller 70.

The measuring unit 61 measures the grade of the excavated materials generated from the tunnel R. The measuring unit 61 is, for example, a measuring device using laser induced breakdown spectroscopy (LIBS). The measuring unit 61 is installed above the belt conveyor 20 inside the main body 10 of the tunnel excavator 1. The measuring unit 61 measures the grade of excavation muck transported by the belt conveyor 20 of the tunnel excavator 1. More specifically, the measuring unit 61 instantaneously generates plasma by emitting a high-output laser beam to the excavation muck on the belt conveyor 20 of the tunnel excavator 1 to heat the excavation muck to 10000° C. or higher. Then, the measuring unit 61 detects an emission spectrum to qualitatively and quantitatively measure elements existing in the vicinity of a focused spot. The measuring unit 61 measures the grade of excavation muck successively or intermittently along the tunnel R. The measuring unit 61 outputs the secondary grade data indicating a measured grade of the excavation muck to a secondary grade data acquisition unit (grade data acquisition unit) 72 of the measurement controller 70. A measurement control unit 71 controls measurement start and end of the measuring unit 61.

Figure 5:
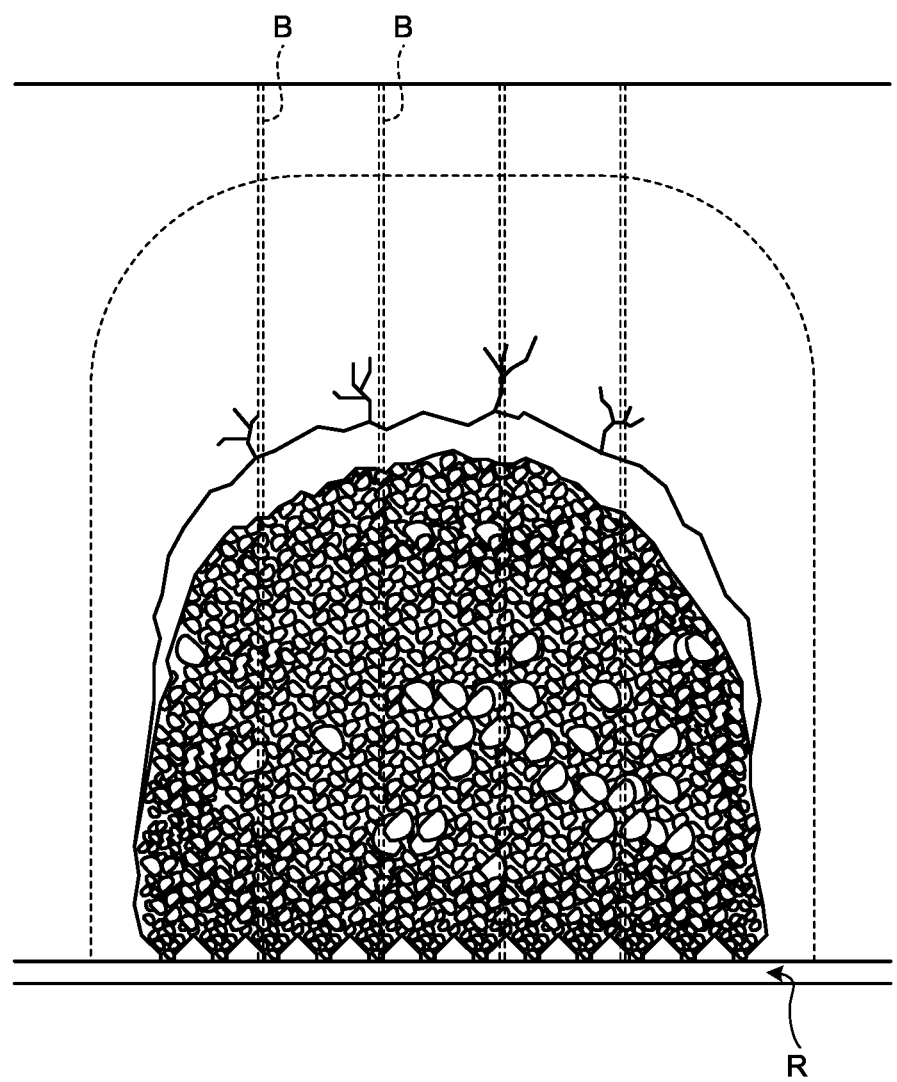
FIG. 5 is a diagram illustrating an example of a tunnel in which secondary grade data is measured.

FIG. 5 is a diagram illustrating an example of the tunnel R in which the secondary grade data is measured. The tunnel R illustrated in FIG. 5 indicates one of the tunnels R in the footprint illustrated in FIG. 1. The measuring unit 61 measures the grade along the tunnel R. A diameter of the tunnel R is about the same as the diameter of the cutter head 30 of the tunnel excavator 1, and is about several meters. The secondary grade data indicates the grade of excavation muck generated when constructing the tunnel R with the diameter of about several meters. FIG. 5 illustrates a bore B drilled in the boring survey conducted prior to the development of the mine. The diameter of the bore B is about several tens of centimeters. The measuring unit 61 measures in a second direction (left-right direction in FIG. 5) included in a second plane (horizontal plane in FIG. 5) intersecting with a first direction (top-bottom direction in FIG. 5) that is a measurement direction in the boring survey. The measuring unit 61 measures a cross section in the second direction broader than a cross section in the first direction in the boring survey.

The measuring unit 61 is not limited to the measuring device using the laser induced breakdown spectroscopy as long as the measuring unit 61 can measure the secondary grade data. The measuring unit 61 may be, for example, a measuring device using, for example, an X-ray fluorescence (XRF) analysis method or a measuring device using a prompt gamma neutron activation (PGNA) analysis method. In the XRF analysis method, an electromagnetic wave (X-ray) is applied to the excavation muck on the belt conveyor 20 of the tunnel excavator 1. Then, by detecting a spectrum of the XRF, elements existing on a surface of the excavation muck are qualitatively and quantitatively measured. In the PGNA analysis method, a neutron ray is applied to the excavation muck on the belt conveyor 20 of the tunnel excavator 1 to activate the internal nuclei. Then, elements are qualitatively and quantitatively measured by measuring the prompt gamma ray generated at the same time.

The secondary grade data storage unit 65 stores, in association with each other, the secondary grade data measured by the measuring unit 61 and secondary position data indicating a grade measurement position of the measuring unit 61 measured by the positioning device 80.

The communication unit 69 is a communication unit that transmits and receives data to and from the management device 100 via the communication network NW. The communication unit 69 transmits the secondary grade data stored in the secondary grade data storage unit 65 to the management device 100 via the communication network NW.

[Control System of Grade Measuring Device]

The grade measuring device 60 is controlled by the measurement controller 70. The measurement controller 70 causes the measurement control unit 71 to control the measurement start and end of the measuring unit 61. The measurement controller 70 causes the secondary grade data acquisition unit 72 to acquire the secondary grade data indicating the grade of the excavation muck as a measurement result of the measuring unit 61, and output the measurement result to a storage control unit 74. The measurement controller 70 causes a secondary position data acquisition unit (position data acquisition unit) 73 to acquire the secondary position data corresponding to the secondary grade data and indicating a position of the tunnel excavator 1 (i.e., grade measurement position of the measuring unit 61) from the positioning device 80, and output the secondary position data to the storage control unit 74. The measurement controller 70 causes the storage control unit 74 to store the secondary grade data and the secondary position data in association with each other in the secondary grade data storage unit 65. The measurement controller 70 causes a transmission control unit 79 to control the communication unit 69 to transmit the secondary grade data and the secondary position data stored in the secondary grade data storage unit 65 to the management device 100. The measurement controller 70 causes the transmission control unit 79 to transmit the secondary grade data to the management device 100, for example, according to a transmission request of the grade map data from the management device 100 or periodically. The transmission control unit 79 transmits the secondary grade data to the management device 100, for example, after the tunnel excavator 1 excavates the entire footprint or every time a predetermined area of the footprint is excavated.

[Positioning Device]

Figure 6:
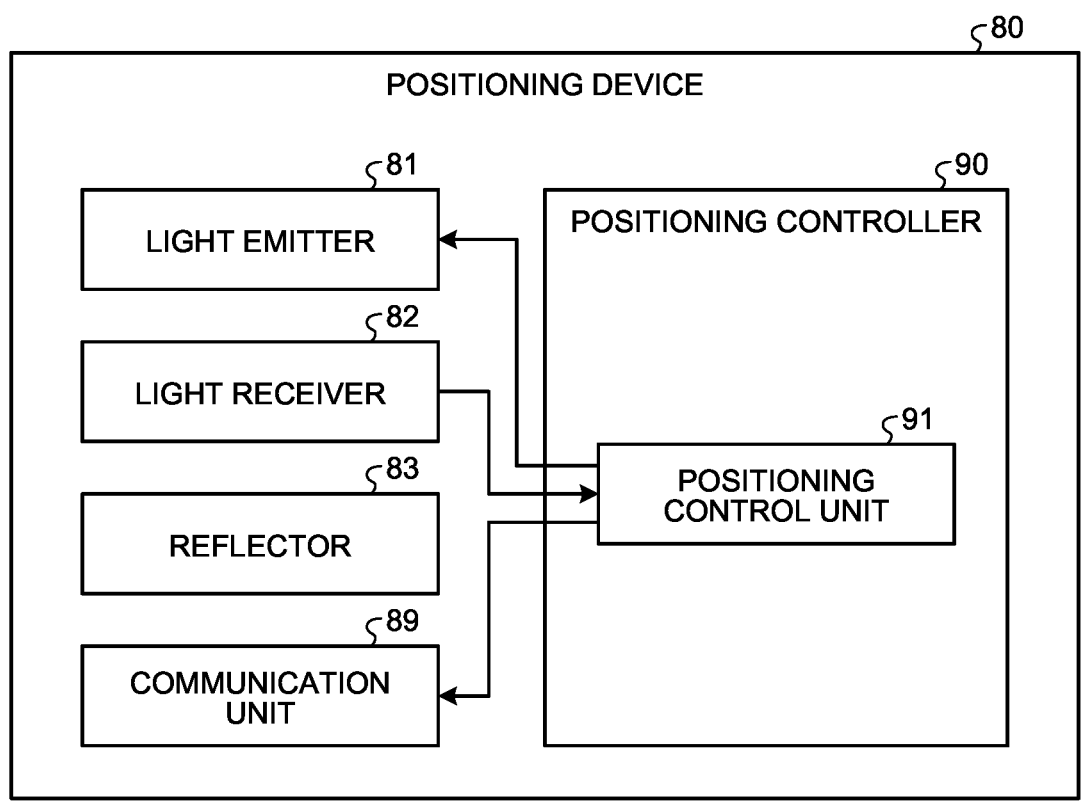
FIG. 6 is a block diagram illustrating a positioning device.

FIG. 6 is a block diagram illustrating the positioning device 80. The positioning device 80 uses a laser beam to measure the secondary position data indicating the position of the tunnel excavator 1 in the tunnel R. The positioning device 80 measures the secondary position data while the measurement system 50 is activated and the grade measuring device 60 measures the secondary grade data. The positioning device 80 is installed in the vicinity of the grade measuring device 60. The position of the positioning device 80 in the tunnel R is measured in advance. The positioning device 80 includes a light emitter 81, a light receiver 82, a reflector 83, a communication unit 89, and a positioning controller 90. The light emitter 81, the light receiver 82, the communication unit 89, and the positioning controller 90 are installed in the main body (not illustrated) of the positioning device 80 that is installed behind the tunnel excavator 1 in the tunnel R. The reflector 83 is installed at the back of the tunnel excavator 1 and faces backward.

The light emitter 81 emits a laser beam toward the tunnel excavator 1. The reflector 83 is, for example, a prism. The reflector 83 reflects the laser beam emitted from the light emitter 81. A reflection signal reflected by the reflector 83 is received by the light receiver 82. A light reception signal received by the light receiver 82 is output to a positioning control unit 91 of the positioning controller 90. The communication unit 89 is a communication unit that transmits and receives data to and from the grade measuring device 60 via the communication network NW. The communication unit 89 transmits the secondary position data measured to the grade measuring device 60 via the communication network NW.

[Control System of Positioning Device]

The positioning device 80 is controlled by the positioning controller 90. The positioning controller 90 includes the positioning control unit 91. The positioning controller 90 causes the positioning control unit 91 to control the start and stop of emission of the laser beam by the light emitter 81. The positioning controller 90 causes the positioning control unit 91 to acquire the light reception signal from the light receiver 82, and calculate secondary position data indicating the position of the tunnel excavator 1 in the tunnel R. The positioning controller 90 causes the positioning control unit 91 to control transmission of the secondary position data to the grade measuring device 60 via the communication unit 89.

The positioning device 80 is not limited to the above configuration as long as the positioning device 80 can measure the secondary position data.

[Management Device]

Figure 7:
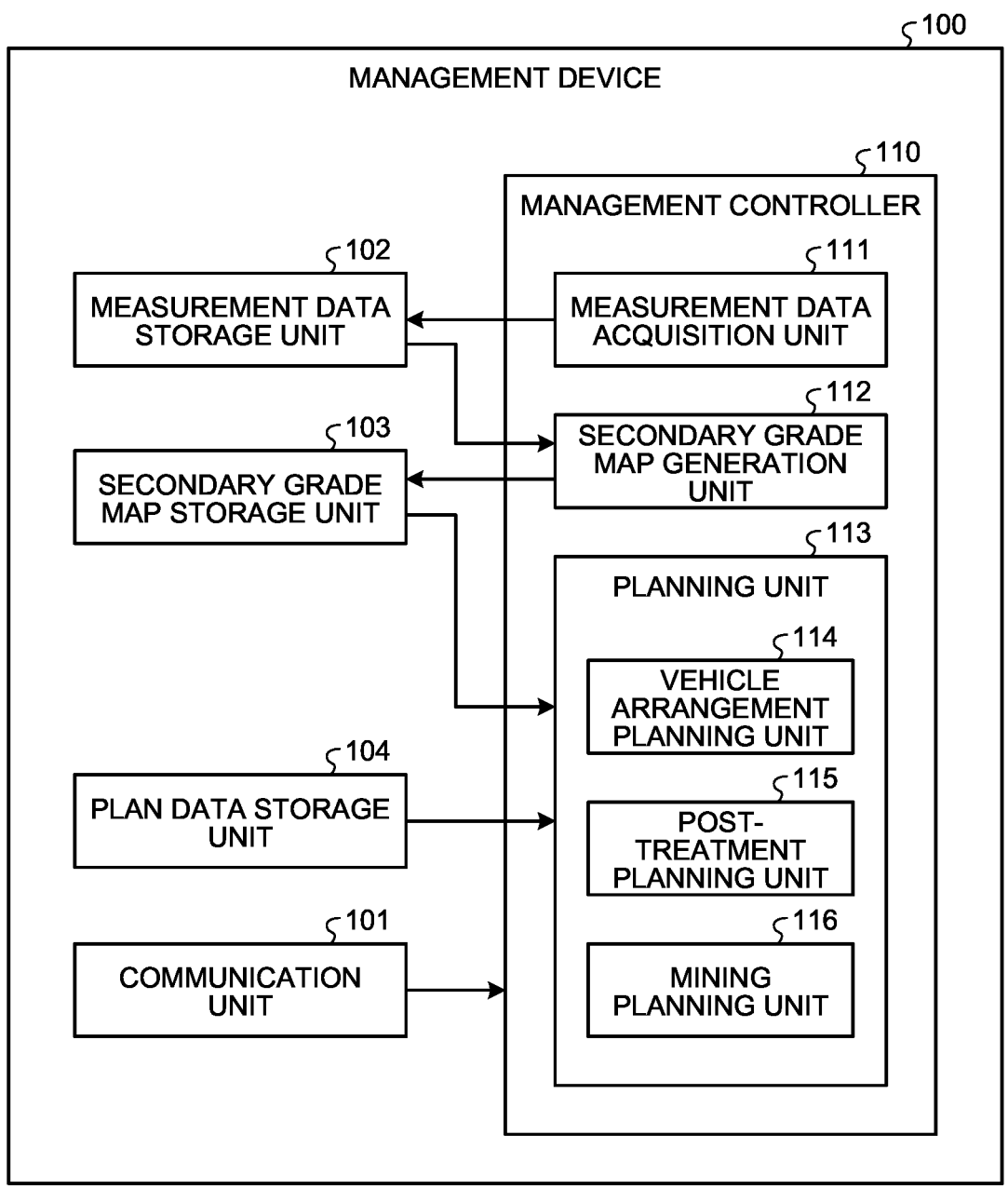
FIG. 7 is a block diagram illustrating a management device.

FIG. 7 is a block diagram illustrating the management device 100. The management device 100 generates the secondary grade map data indicating the ore grade distribution along the tunnel R based on the secondary grade data and the secondary position data acquired from the grade measuring device 60. The management device 100 verifies and modifies the mining plan based on the secondary grade map data. The management device 100 includes a communication unit 101, a measurement data storage unit 102, a secondary grade map storage unit 103, a plan data storage unit 104, and a management controller 110.

The secondary grade map data is generated based on a plurality of pieces of secondary grade data and secondary position data measured at the time of construction of the tunnel R. The secondary grade map data shows two-dimensional ore grade distribution along the tunnel R. The secondary grade map data can complement the primary grade map data. The secondary grade map data includes at least a part of the horizontal tunnel HR (Header) to access to the vein included in the preplanned mining plan.

The plan data is data indicating a plan for mining ore from the mine, which is planned based on the primary grade map data. The plan data may include a daily or weekly short-term plan, a monthly or yearly mid-term plan, and a long-term plan such as a period over an entire life cycle of the mine. For example, the plan data includes vehicle arrangement plan data indicating a plan for arranging loading machines and transport machines, which is planned based on the primary grade map data. The vehicle arrangement plan data includes, for example, plan data such as the number of loading machines and transport machines arranged for mining ore of a desired grade at a desired timing, a vehicle route including positions to load and discharge excavation muck, and the vehicle arrangement time. For example, the plan data includes post-treatment plan data indicating a post-treatment plan such as crushing and refining of mined ore, which is planned based on the primary grade map data. The post-treatment plan data includes plan data such as a post-treatment schedule and a location of an ore yard where mined ore is stored until post-treatment. For example, the plan data includes mining plan data indicating future mining plans, which is planned based on the primary grade map data.

The communication unit 101 is a communication unit that transmits and receives data to and from the grade measuring device 60 via the communication network NW. The communication unit 101 acquires the secondary grade data and the secondary position data from the grade measuring device 60 via the communication network NW. The measurement data storage unit 102 stores the secondary grade data and the secondary position data acquired from the grade measuring device 60. The secondary grade map storage unit 103 stores the secondary grade map data generated by a secondary grade map generation unit (grade map generation unit) 112 of the management controller 110. The plan data storage unit 104 stores, for example, the primary grade map data indicating the ore grade distribution, including the primary grade data measured by the boring survey and the primary position data corresponding to the primary grade data. The plan data storage unit 104 stores the plan data indicating the mining plan of the mine planned based on the primary grade map data.

[Control System of Management Device]

The management device 100 is controlled by the management controller 110. The management controller 110 includes a measurement data acquisition unit 111, a secondary grade map generation unit 112, and a planning unit 113.

The measurement data acquisition unit 111 acquires the secondary grade data and the secondary position data from the grade measuring device 60 via the communication unit 101. The measurement data acquisition unit 111 stores the secondary grade data and the secondary position data acquired in the measurement data storage unit 102.

The secondary grade map generation unit 112 generates the secondary grade map data indicating the ore grade distribution along the tunnel R based on the plurality of pieces of secondary grade data and secondary position data stored in the measurement data storage unit 102. The secondary grade map generation unit 112 stores the secondary grade map data generated in the secondary grade map storage unit 103. The secondary grade map generation unit 112 is executed periodically or at an arbitrary timing. For example, the secondary grade map generation unit 112 may be executed after the tunnel excavator 1 excavates the entire footprint or every time a predetermined area of the footprint is excavated.

The planning unit 113 verifies and modifies the plan data based on the secondary grade map data stored in the secondary grade map storage unit 103. The planning unit 113 includes a vehicle arrangement planning unit 114, a post-treatment planning unit 115, and a mining planning unit 116. The planning unit 113 is executed periodically or at an arbitrary timing. For example, the planning unit 113 may be executed every time the secondary grade map data is stored in the secondary grade map storage unit 103.

Based on the secondary grade map data stored in the secondary grade map storage unit 103, the vehicle arrangement planning unit 114 generates a vehicle arrangement plan for loading machines and transport machines in the tunnel R, or verifies and modifies the vehicle arrangement plan already included in the preplanned mining plan. For example, the vehicle arrangement planning unit 114 generates a vehicle arrangement plan based on the secondary grade map data so that the vehicle route includes the loading position and the discharge position of the excavation muck according to the ore grade. For example, the vehicle arrangement planning unit 114 verifies and modifies the vehicle arrangement plan based on the secondary grade map data to determine whether the vehicle route includes the loading position and the discharge position of the excavation muck according to the ore grade.

The post-treatment planning unit 115 generates a post-treatment plan, such as crushing and refining, after the construction of the tunnel R based on the secondary grade map data stored in the secondary grade map storage unit 103, or verifies and modifies the post-treatment plan already included in the preplanned mining plan. For example, the post-treatment planning unit 115 generates a post-treatment plan, based on the secondary grade map data, with respect to the post-treatment schedule and the ore yard location according to the ore grade. For example, the post-treatment planning unit 115 verifies and modifies the post-treatment plan, based on the secondary grade map data, with respect to the post-treatment schedule and the ore yard location according to the ore grade.

The mining planning unit 116 generates a future mining plan based on the secondary grade map data stored in the secondary grade map storage unit 103, or verifies and modifies the preplanned mining plan.

[Computer System]

Figure 8:
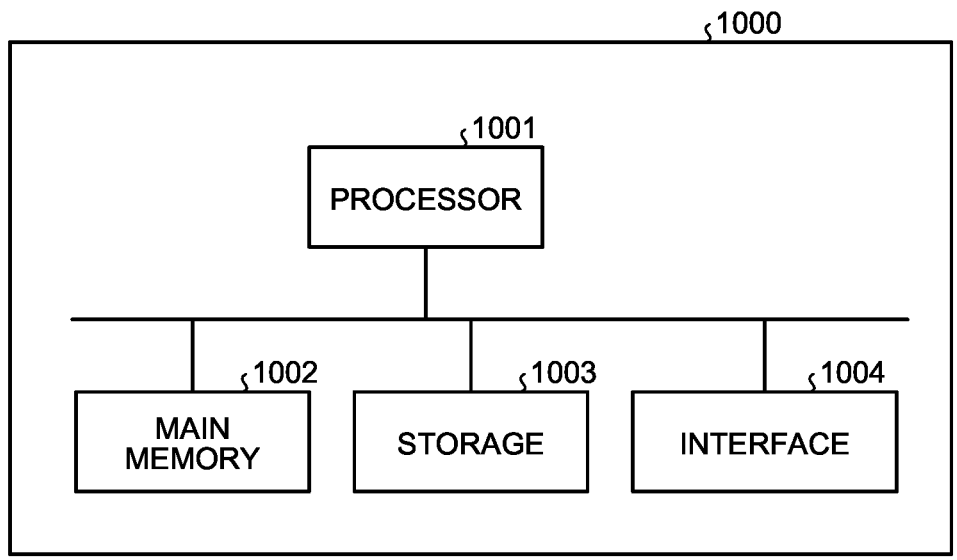
FIG. 8 is a block diagram illustrating a computer system.

FIG. 8 is a block diagram illustrating a computer system 1000. Each of the above-described measurement controller 70 of the grade measuring device 60, the positioning controller 90 of the positioning device 80, and the management controller 110 of the management device 100 includes the computer system 1000. The computer system 1000 includes a processor 1001 such as a central processing unit (CPU), a main memory 1002 including a non-volatile memory such as read only memory (ROM) and a volatile memory such as random access memory (RAM), a storage 1003, and an interface 1004 including an input/output circuit. The above-described function of each of the measurement controller 70 of the grade measuring device 60, the positioning controller 90 of the positioning device 80, and the management controller 110 of the management device 100 is stored as a program in the storage 1003 of each computer system 1000. The processor 1001 reads the program from the storage 1003, develops the program into the main memory 1002, and executes the above-described process according to the program. The program may be distributed to the computer system 1000 via a network.

[Measurement Method by Grade Measuring Device]

Figure 9:
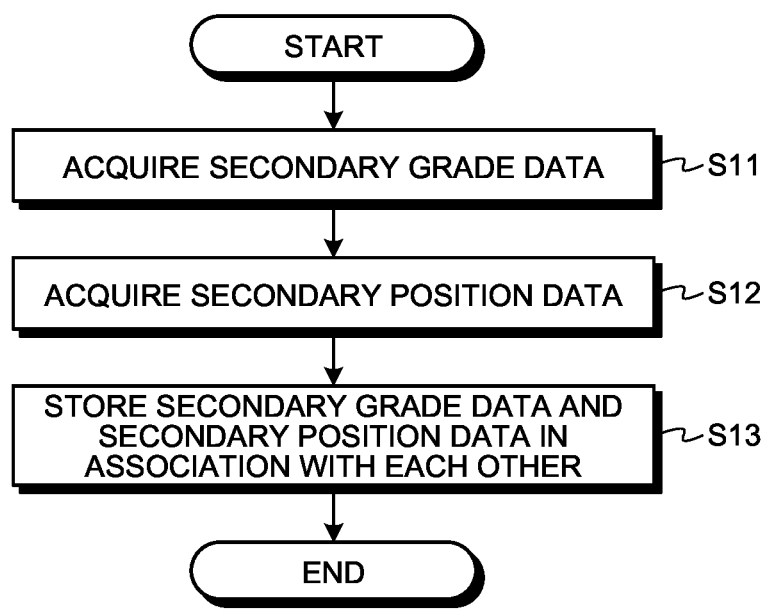
FIG. 9 is a flowchart illustrating an example of a process procedure of a measurement process in a measuring device.

Next, a measurement process in the grade measuring device 60 will be described. FIG. 9 is a flowchart illustrating an example of a process procedure of the measurement process in the grade measuring device 60. The measurement system 50 is activated while the tunnel excavator 1 is constructing the tunnel R. While the measurement system 50 is activated, the measuring unit 61 of the grade measuring device 60 measures the grade of the excavation muck, and the positioning device 80 measures the position of the tunnel excavator 1. In the grade measuring device 60, the process in Steps S11 to S13 is repeated.

The measurement controller 70 causes the secondary grade data acquisition unit 72 to acquire the secondary grade data measured by the measuring unit 61 and indicating the grade of the excavation muck at the time of construction of the tunnel R (Step S11). The measurement controller 70 proceeds to Step S12.

The measurement controller 70 causes the secondary position data acquisition unit 73 to acquire the secondary position data indicating the position of the tunnel excavator 1 (i.e., grade measurement position of the measuring unit 61) from the positioning device 80 (Step S12). The measurement controller 70 proceeds to Step S13.

The measurement controller 70 causes the storage control unit 74 to store the secondary grade data and the secondary position data, in association with each other, in the secondary grade data storage unit 65 (Step S13). The measurement controller 70 ends the process.

When the tunnel R is constructed by the tunnel excavator 1, the secondary grade data and the secondary position data indicating the ore grade along the tunnel R are acquired through this process.

[Method of Generating Grade Map by Management Device]

Figure 10:
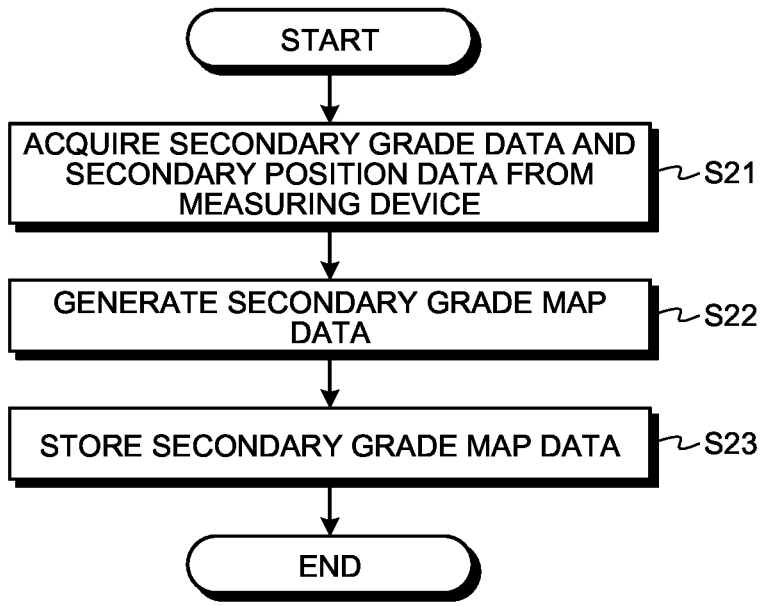
FIG. 10 is a flowchart illustrating an example of a process procedure of a grade map generation process in the management device.

Next, a grade map generation process in the management device 100 will be described. FIG. 10 is a flowchart illustrating an example of a process procedure of the grade map generation process in the management device 100. The management device 100 executes the grade map generation process periodically or at an arbitrary timing. For example, the management device 100 may execute the grade map generation process after the tunnel excavator 1 excavates the entire footprint or every time a predetermined area of the footprint is excavated.

The management controller 110 causes the measurement data acquisition unit 111 to acquire the secondary grade data and the secondary position data from the grade measuring device 60 (Step S21). The secondary grade data and the secondary position data acquired by the measurement data acquisition unit 111 are stored in the measurement data storage unit 102. The management controller 110 proceeds to Step S22.

The management controller 110 causes the secondary grade map generation unit 112 to generate the secondary grade map data indicating the ore grade distribution along the tunnel R based on the plurality of pieces of secondary grade data and the secondary position data stored in the measurement data storage unit 102 (Step S22). The management controller 110 proceeds to Step S23.

The management controller 110 stores the secondary grade map data generated by the secondary grade map generation unit 112 in the secondary grade map storage unit 103 (Step S23). The management controller 110 ends the process.

[Planning Method by Management Device]

Figure 11:
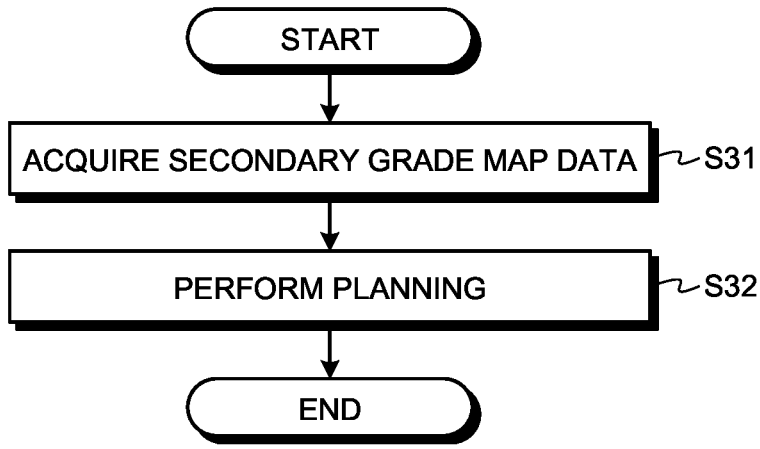
FIG. 11 is a flowchart illustrating an example of a process procedure of a planning process in the management device.

Next, a planning process in the management device 100 will be described. FIG. 11 is a flowchart illustrating an example of a process procedure of the planning process in the management device 100. The management device 100 executes the planning process periodically or at an arbitrary timing. For example, the management device 100 may execute the planning process every time the secondary grade map data is stored in the secondary grade map storage unit 103.

The management controller 110 acquires the secondary grade map data stored in the secondary grade map storage unit 103 (Step S31). The management controller 110 proceeds to Step S32.

The management controller 110 causes the planning unit 113 to execute the planning process based on the secondary grade map data (Step S32). For example, the vehicle arrangement planning unit 114 generates a vehicle arrangement plan based on the secondary grade map data so that the vehicle route includes the loading position and the discharge position of the excavation muck according to the ore grade, or verifies and modifies the preplanned vehicle arrangement plan. For example, the post-treatment planning unit 115 generates the post-treatment plan, based on the secondary grade map data, with respect to the post-treatment schedule and the ore yard location according to the ore grade, or verifies and modifies the preplanned post-treatment plan. For example, the mining planning unit 116 generates a future mining plan based on the secondary grade map data stored in the secondary grade map storage unit 103, or verifies and modifies the preplanned mining plan.

[Effects]

In the present embodiment, the grade measuring device 60 acquires the secondary grade data and the secondary position data indicating the ore grade along the tunnel R when the tunnel R is constructed by the tunnel excavator 1. According to the present embodiment, in the underground mining method, the ore grade can be measured at the time of constructing the tunnel R before starting the mining of the ore.

In the present embodiment, the secondary grade data is measured continuously or discretely along the tunnel R. As a result, the present embodiment can acquire the secondary grade data along the tunnel R.

In the present embodiment, the management device 100 generates the secondary grade map data indicating the ore grade distribution along the tunnel R based on the secondary grade data and the secondary position data acquired from the grade measuring device 60. According to this embodiment, it is possible to generate the secondary grade map data at the time of constructing the tunnel R before starting the mining of the ore. According to the present embodiment, the ore grade and contained minerals can be analyzed in detail at an early stage before starting the mining of the ore. Accordingly, the present embodiment can increase opportunities of measuring the ore grade.

When the ore distribution is complicated, the primary grade map data obtained through preliminary geological surveys, such as the boring survey, conducted during vein search and exploration may be insufficient. The present embodiment can complement the primary grade map data by increasing the opportunities of measuring the ore grade. Accordingly, the present embodiment is useful for identifying the ore grade and contained minerals even when the ore distribution is complicated.

In the present embodiment, the secondary grade map data includes at least a part of the horizontal tunnel HR (Header) to access to the vein, which is included in the preplanned footprint. According to the present embodiment, the secondary grade map data can be generated along the tunnel R near the vein.

In the present embodiment, the grade measuring device 60 measures along the second direction included in the second plane intersecting the first direction that is the measurement direction in the boring survey. According to the present embodiment, it is possible to generate the secondary grade map data that complements the primary grade map data. In the present embodiment, it is possible to acquire the secondary grade map data different from the primary grade map data obtained through the boring survey and the like. Accordingly, the present embodiment can improve the measurement accuracy of the ore grade and increase opportunities of measuring the ore grade.

In the present embodiment, the grade measuring device 60 measures a cross-sectional area in the second direction broader than the cross-sectional area in the first direction in the boring survey. In the present embodiment, the grade measuring device 60 measures the grade of excavation muck generated when constructing the tunnel R having the diameter of about several meters that is larger than the bore B for the boring survey. Accordingly, the present embodiment can improve the measurement accuracy of the ore grade.

In the present embodiment, it is possible to generate the vehicle arrangement plan for loading machines and transport machines in the tunnel R, or to verify and modify the preplanned vehicle arrangement plan based on the secondary grade map data. Accordingly, the present embodiment can increase productivity by creating a more appropriate vehicle arrangement plan.

In the present embodiment, the post-treatment plan indicating a post-treatment plan such as for crushing and refining after the construction of the tunnel R is generated, or the preplanned post-treatment plan is verified and modified based on the secondary grade map data. Accordingly, the present embodiment can increase productivity by creating a more appropriate post-treatment plan.

In the present embodiment, the future mining plan can be generated, or the preplanned mining plan can be verified and modified based on the secondary grade map data. Accordingly, the present embodiment can increase productivity by a more appropriate mining plan.

In the present embodiment, when the tunnel R is constructed, the excavation muck is measured on the belt conveyor 20 of the tunnel excavator 1. According to the present embodiment, in order to measure the secondary grade data, it is possible to easily measure without sampling the excavation muck or specimen for measurement.

In the present embodiment, since the grade is measured using the laser induced breakdown spectroscopy, the accuracy of measuring the ore grade can be improved.

Conventionally, the tunnel R in the underground mining method has been regarded as a mere access route or a transport route to the vein. According to the present embodiment, the secondary grade map data along the tunnel R can be created and used for the mining work.

Modified Example

The above describes the case of applying the measurement system 50 to the tunnel excavator 1. However, the present invention is not limited thereto. For example, the present invention is also applicable to, for example, a drill jumbo or a free cross-section excavator.

Further, the above describes an example of measuring the secondary grade data indicating the ore grade along the tunnel R using the measurement system 50 at the time of constructing the tunnel R in the development stage of the mine. However, the present invention is not limited thereto. The secondary grade data indicating the ore grade may be measured along the tunnel R using the measurement system 50 in the ore production stage after the footprint is formed.

The above describes the case of applying the measurement system 50 to the block caving method in the underground mining methods. However, the present embodiment is not limited thereto. For example, the measurement system 50 is also applicable to the room and pillar method and the sub-level stopping method.

REFERENCE SIGNS LIST

1 TUNNEL EXCAVATOR
10 MAIN BODY
20 BELT CONVEYOR
29 DRIVE MOTOR
30 CUTTER HEAD
40 DISC CUTTER
50 MEASUREMENT SYSTEM
60 GRADE MEASURING DEVICE
61 MEASURING UNIT (GRADE MEASURING UNIT)
65 SECONDARY GRADE DATA STORAGE UNIT (GRADE STORAGE UNIT)
69 COMMUNICATION UNIT
70 MEASUREMENT CONTROLLER
71 MEASUREMENT CONTROL UNIT
72 SECONDARY GRADE DATA ACQUISITION UNIT (GRADE DATA ACQUISITION UNIT)
73 SECONDARY POSITION DATA ACQUISITION UNIT (POSITION DATA ACQUISITION UNIT)
74 STORAGE CONTROL UNIT
79 TRANSMISSION CONTROL UNIT
80 POSITIONING DEVICE
81 LIGHT EMITTER
82 LIGHT RECEIVER
83 REFLECTOR
89 COMMUNICATION UNIT
90 POSITIONING CONTROLLER
91 POSITIONING CONTROL UNIT
100 MANAGEMENT DEVICE
101 COMMUNICATION UNIT
102 MEASUREMENT DATA STORAGE UNIT
103 SECONDARY GRADE MAP STORAGE UNIT
104 PLAN DATA STORAGE UNIT
110 MANAGEMENT CONTROLLER
111 MEASUREMENT DATA ACQUISITION UNIT
112 SECONDARY GRADE MAP GENERATION UNIT (GRADE MAP GENERATION UNIT)
113 PLANNING UNIT
114 VEHICLE ARRANGEMENT PLANNING UNIT
115 POST-TREATMENT PLANNING UNIT
116 MINING PLANNING UNIT

The invention claimed is:

1. A measurement system that measures a grade of an excavated material generated from an underground tunnel, the underground tunnel being excavated by a tunnel excavator based on a mining plan of a mine planned based on primary grade data indicating an ore grade measured in a preliminary geological survey, which includes a boring survey, and primary position data corresponding to the primary grade data, the measurement system comprising:
   a grade measuring device that measures the grade of the excavated material generated from the underground tunnel, and measures a secondary grade data indicating a grade of the excavated material, by detecting an emission spectrum obtained by emitting light to the excavated material;
   a positioning device that acquires secondary position data indicating a measuring position of the secondary grade data, by receiving a reflected light of a light which is emitted to the tunnel excavator; and
   a processor,
   wherein the processor causes a storage to store the secondary grade data and the secondary position data in association with each other.

2. The measurement system according to claim 1, wherein the grade measuring device continuously or discretely measures the grade along the underground tunnel.

3. The measurement system according to claim 2, wherein the processor is further configured to:
   generate data indicating a grade distribution of the excavated material along the underground tunnel based on a plurality of pieces of the secondary grade data and the secondary position data stored in the storage.

4. The measurement system according to claim 3, wherein the processor is further configured to:
   generate data including at least a part of a horizontal tunnel to access to a vein, the horizontal tunnel being preplanned and included in the mining plan.

5. The measurement system according to claim 1, wherein
   the tunnel excavator includes a belt conveyor that transports the excavated material, and the grade measuring device measures the grade of the excavated material on the belt conveyor.

6. The measurement system according to claim 1, wherein the grade measuring device is an apparatus using laser induced breakdown spectroscopy.

7. A measurement method of measuring a grade of an excavated material generated from an underground tunnel, the underground tunnel excavated by a tunnel excavator based on a mining plan of a mine planned based on primary grade data indicating an ore grade measured by a preliminary geological survey, which includes a boring survey, and the primary grade data, the measurement method comprising:

measuring the grade of the excavated material, including elemental composition, generated from the underground tunnel;

measuring a secondary grade data indicating a grade of the excavated material, by detecting an emission spectrum obtained by emitting light to the excavated material;

acquiring secondary position data indicating a measuring position of the secondary grade data, by receiving a reflected light of a light which is emitted to the tunnel excavator; and storing the secondary grade data and the secondary position data in association with each other.

\* \* \* \* \*